Jan. 22, 1957  J. R. GIER, JR  2,778,385
APPARATUS AND METHOD FOR FORMING SINUOUS WIRE
STRUCTURAL AND HEAT EXCHANGE ELEMENTS
Filed March 17, 1953  8 Sheets-Sheet 1
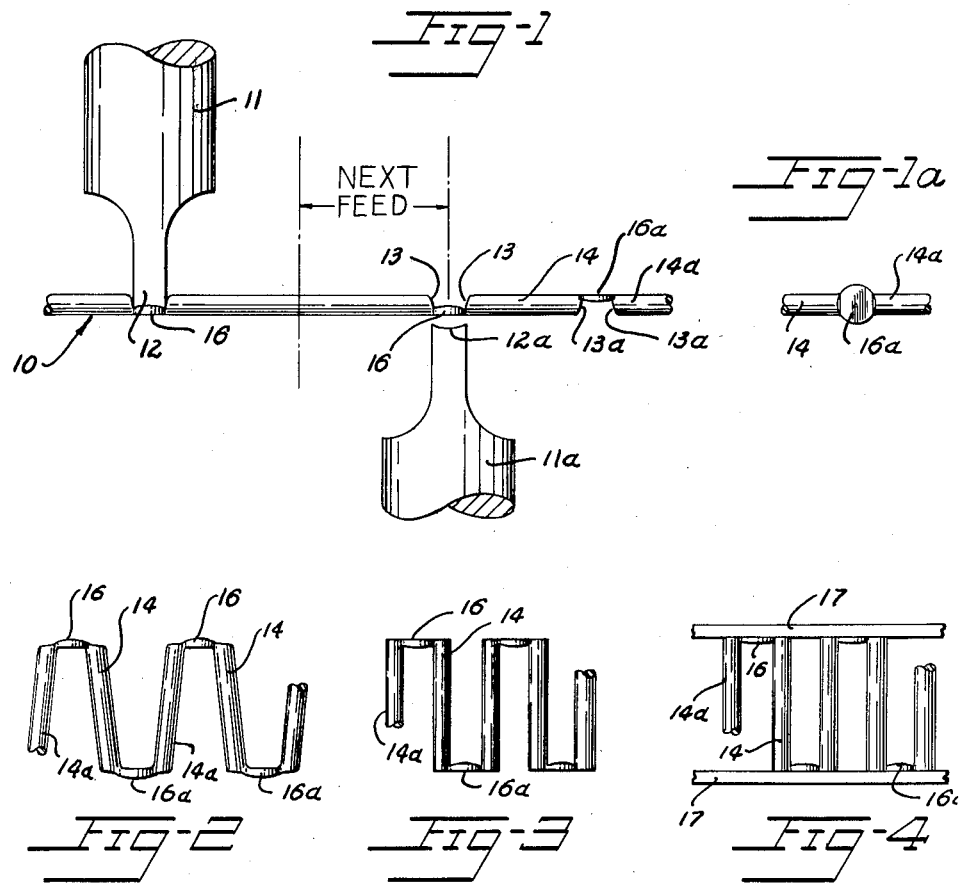
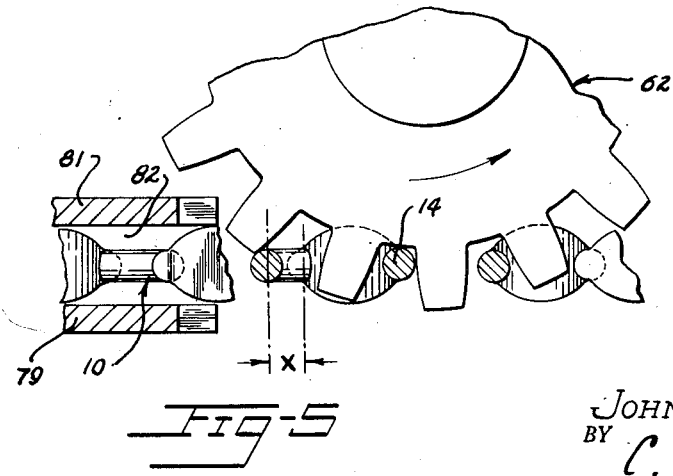
INVENTOR.
JOHN R. GIER JR.
BY C. E. Tripp
ATTY.

Fig-6

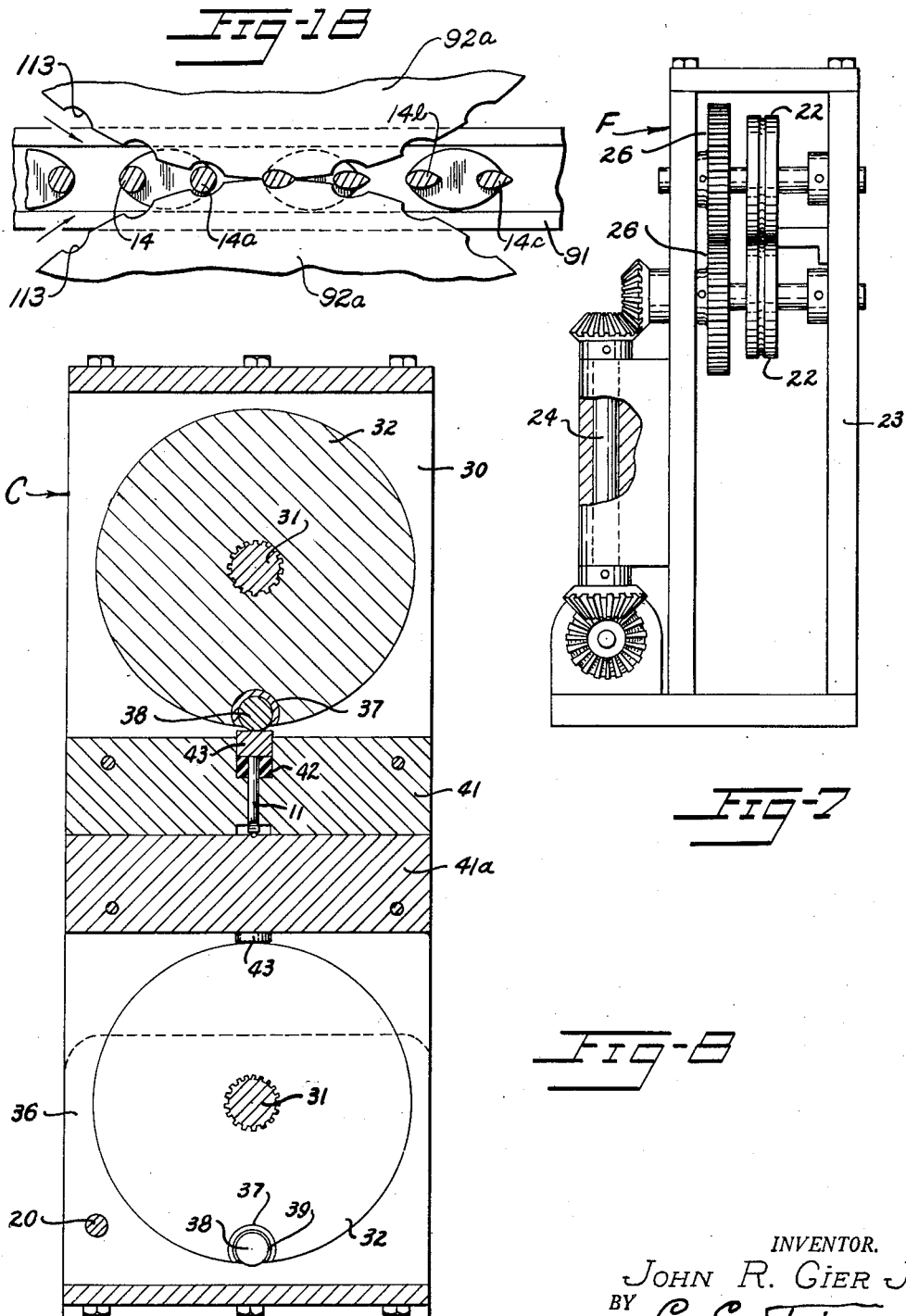

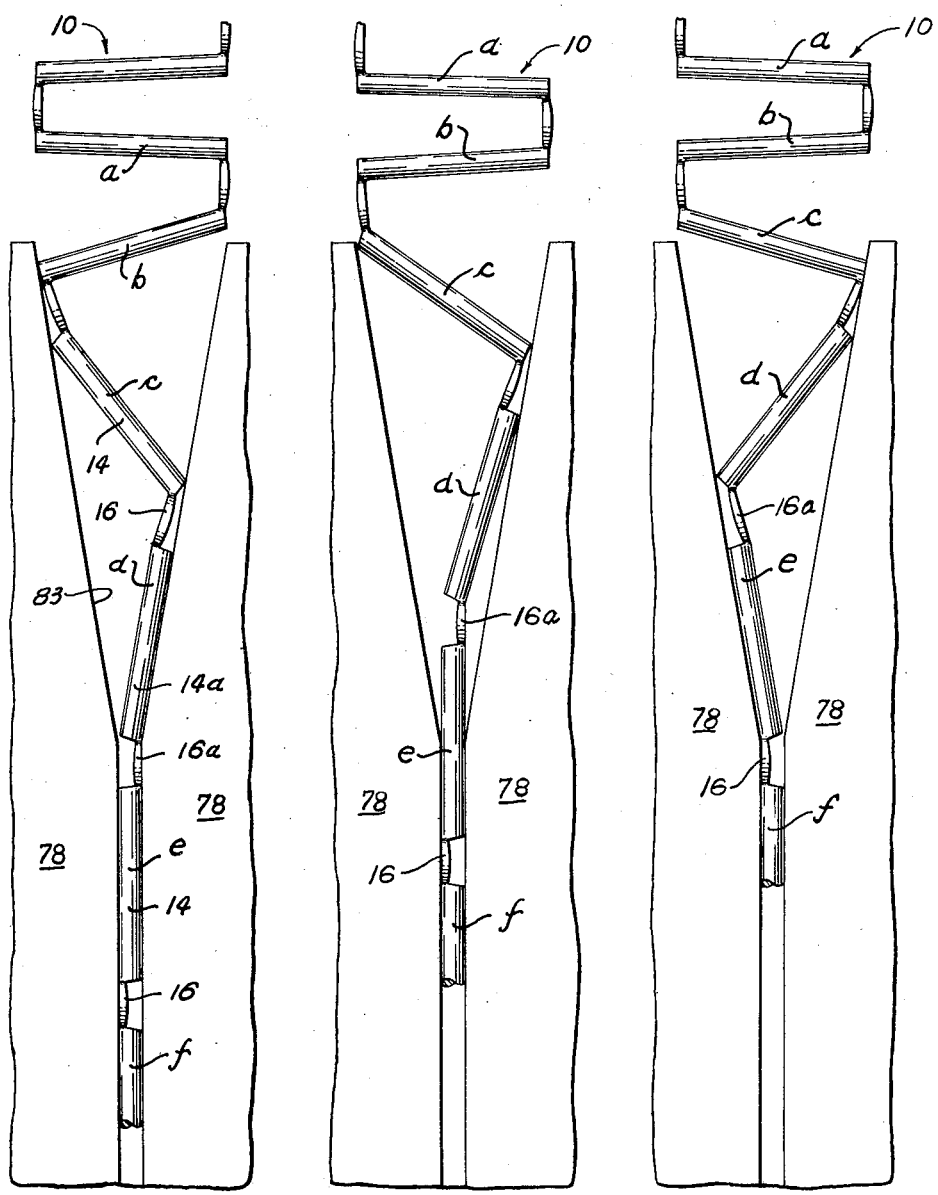

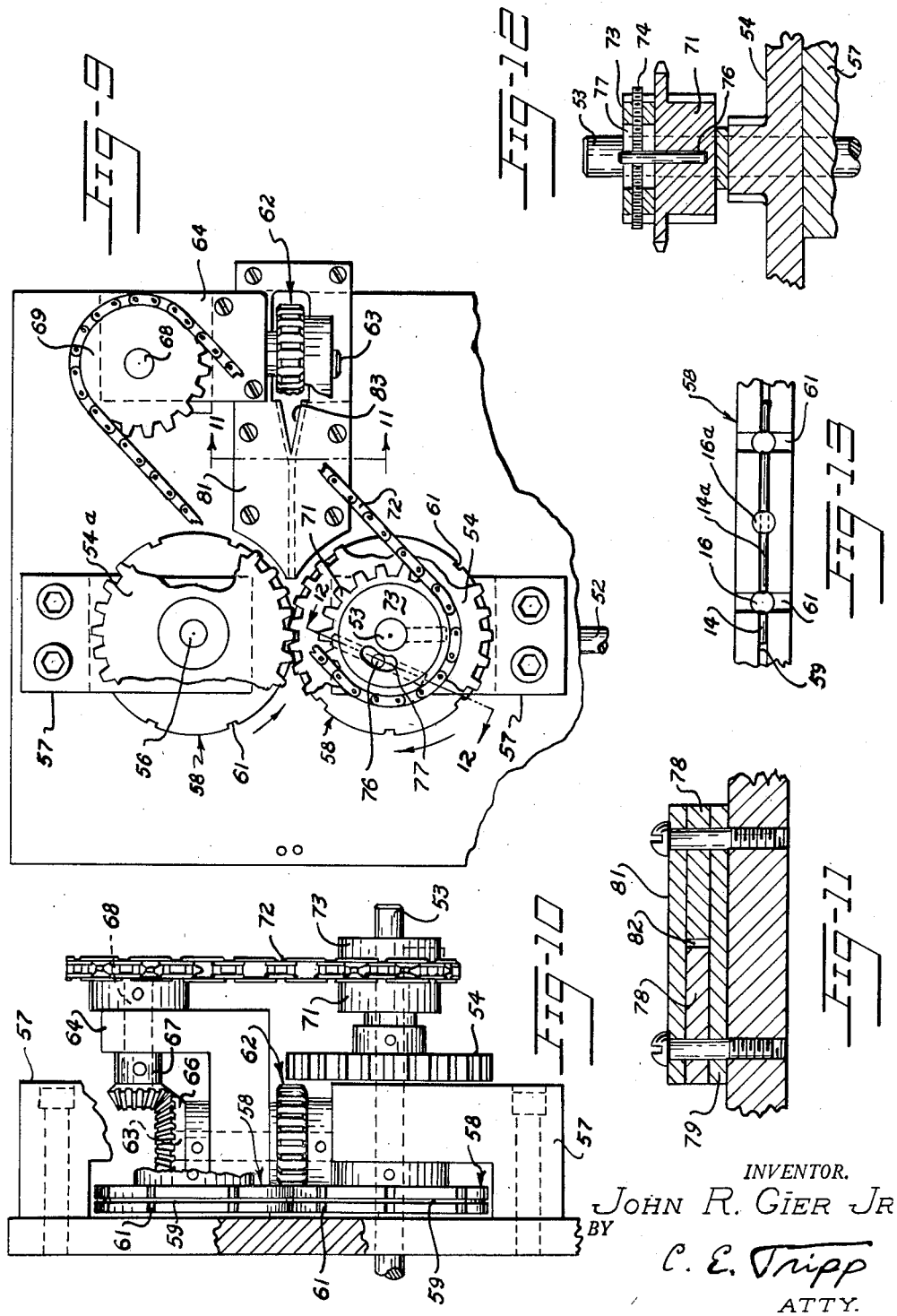

Jan. 22, 1957 J. R. GIER, JR 2,778,385
APPARATUS AND METHOD FOR FORMING SINUOUS WIRE
STRUCTURAL AND HEAT EXCHANGE ELEMENTS
Filed March 17, 1953 8 Sheets-Sheet 6

INVENTOR.
JOHN R. GIER JR.
BY C.E. Tripp
ATTY.

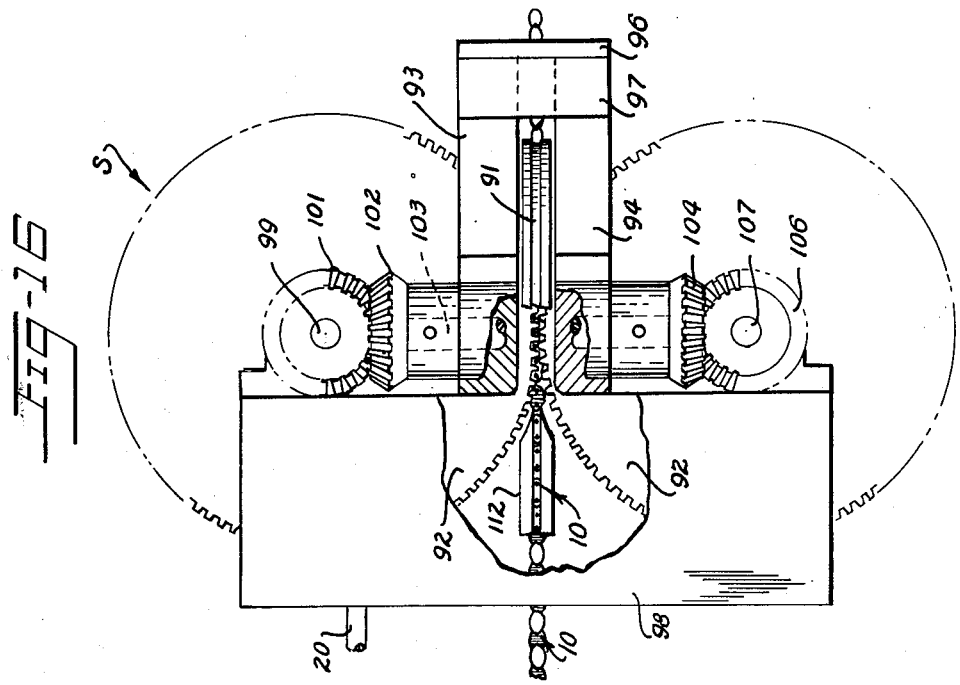
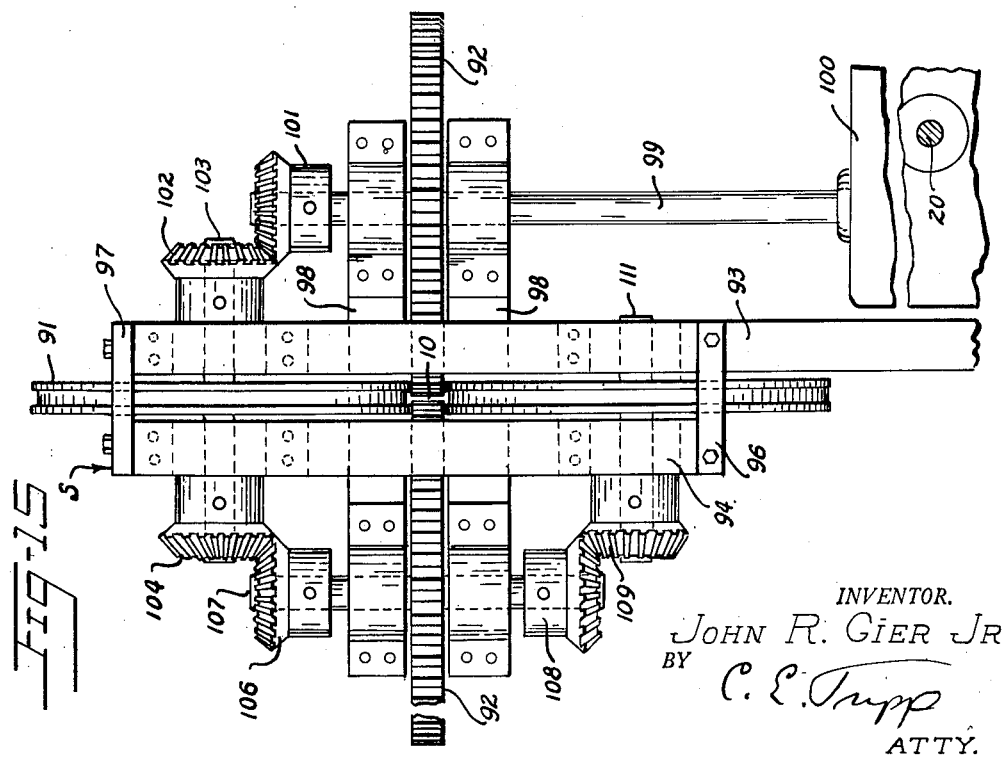

United States Patent Office 2,778,385
Patented Jan. 22, 1957

2,778,385

APPARATUS AND METHOD FOR FORMING SINUOUS WIRE STRUCTURAL AND HEAT EXCHANGE ELEMENTS

John R. Gier, Jr., Cleveland, Ohio

Application March 17, 1953, Serial No. 342,823

17 Claims. (Cl. 140—71)

This invention relates to method and apparatus for forming sinuous wire elements of the type having flattened ligaments connected by generally parallel pins for use in heat exchangers and structural assemblies, as explained in my copending application Serial No. 129,159, filed August 11, 1950, issued May 18, 1954, as Patent No. 2,678,808, entitled "Sinuous Wire Structural Heat Exchange Element and Assembly," and of which this application is a continuation-in-part.

The advantages of the sinuous wire elements for heat exchangers and structural assemblies have all been explained in the aforesaid application. The elements as disclosed in said application make it possible to commercially produce heat exchangers and other assemblies wherein the extended surface or structural elements consists of a myriad of parallel wirelike pins extending directly between and normal to fluid confining plates or the like, fluid flow along the plates or tubes being virtually unobstructed at the junction of the pins and fluid walls. Although the sinuous wire elements forming the subject matter of this invention are by their very nature an advance in the art in that they for the first time make possible the formation of compact, high efficiency assemblies such as those referred to, these assemblies must economically compete with other constructions such as flanged fins or the like, which have been highly developed in the art and the techniques for manufacture of which are widely known and commonly practiced. Thus in many cases, although assemblies formed in accordance with this invention may have numerous advantages in terms of size, weight, and efficiency, unless these assemblies can be produced on a competitive basis the use of such assemblies will at best be limited to applications wherein cost is not factor.

Accordingly, a principal object of this invention is to make available to industry heat exchangers and structural assemblies having the advantages peculiar to the construction forming the subject matter of this invention, at a cost which makes it economically feasible to manufacture assemblies. As disclosed in my aforesaid application, straight wire is first notched from opposite sides to form spaced flattened ligaments, and the notched wire is bent into sinuous form and coined to provide thin, flat bonding areas.

Once formed, the sinuous wire elements referred to lend themselves to mass production bonding techniques such as the use of continuous brazing furnaces, which make possible the simultaneous joining of an almost unlimited number of small pieces. Thus, the critical aspect of the manufacturing process in so far as speed and cost are concerned is the actual formation of the sinuous wire elements themselves, and it is to this operation to which this invention is directed.

The formation of completed sinuous wire elements accordance with this invention involves a novel combination of operations all of which are capable of being performed at high speeds and on a continuous basis including the following:

(1) A continuous wire feed system wherein in one form of which the wire is advanced by feed rolls which are not operated intermittently but rather are rotated continuously even though the wire is temporarily restrained by reciprocating notching punches that initially form the flattened ligaments;

(2) The alternate, oppositely directed reciprocating punching operation performed by apparatus capable of high speed production;

(3) A self-alternating gathering, buckling or folding operation which is inherently such a high speed process that it may be readily and continuously performed at the maximum speed of the other parts of the machine, and;

(4) One or more continuous sizing or coining operations performed on the coined and flattened ligaments after the gathering operation to give the required planar bonding surfaces.

As a result, a completed sinuous wire element can be made at speeds not obtainable by currently available production or special machines nor by a single production line of a series of known or commercial machines available to the trade or known in the art.

The manner in which these and other objects are obtained will be apparent from the following detailed description of a preferred embodiment of the invention.

In the drawings,

Figure 1 is an enlarged fragmentary side elevation showing the first operation performed on the wire, namely the alternating punching;

Figure 1a is a plan view of one of the flattened ligaments;

Figure 2 is a side elevation showing the wire after the folding or gathering operation;

Figure 3 is a side elevation showing the wire after the sizing operation;

Figure 4 is a side elevation showing the wire bonded between two plates as fully described in the aforesaid application;

Figure 5 is a plan view showing the gathering operation;

Figure 6:
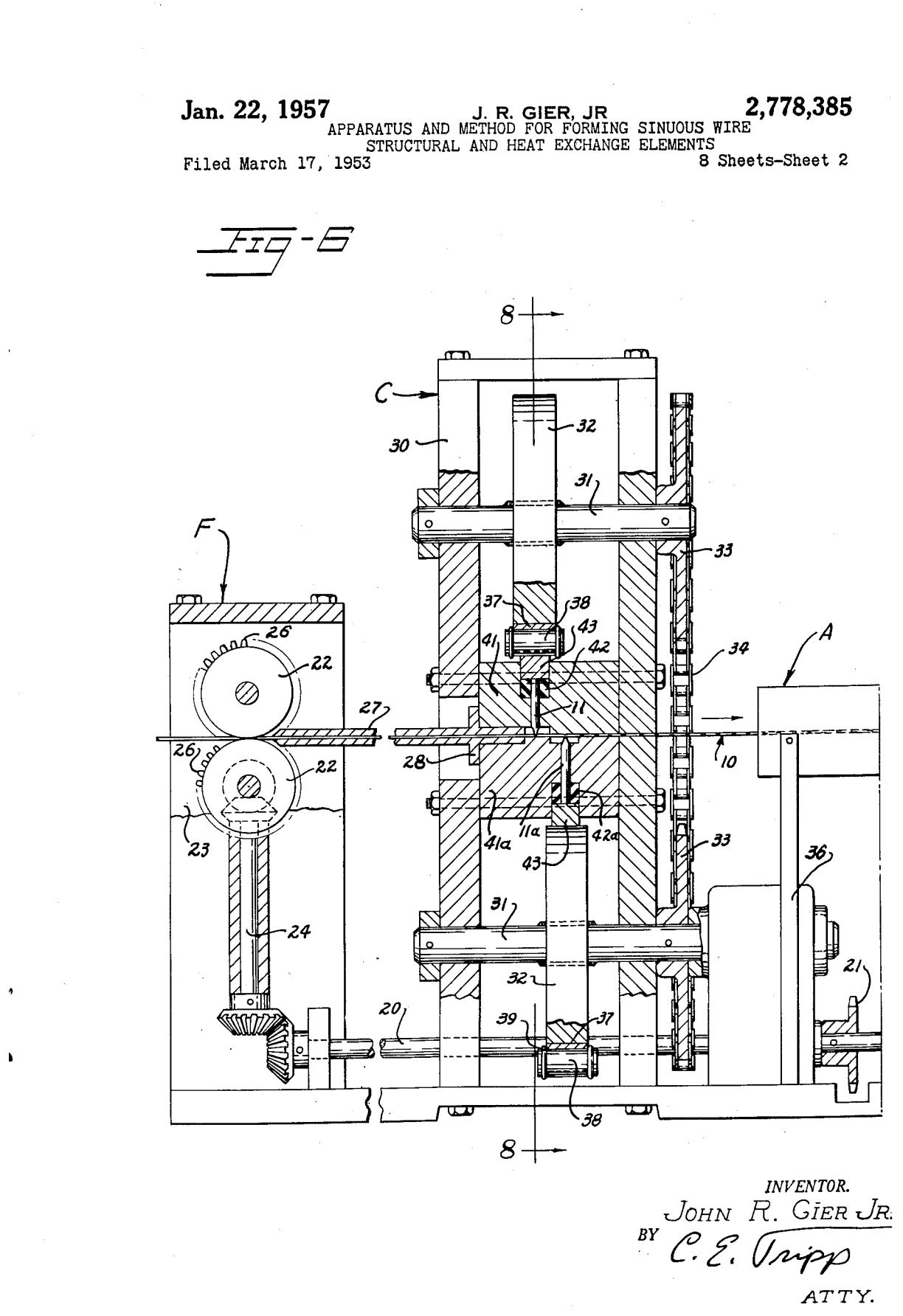

Figure 6 is a side elevation showing the feeding and coining or puching apparatus;

Figure 7 is a left end elevation of the feed device illustrated in Figure 6;

Figure 8 is a section taken on 8—8 of Figure 6 showing the punching device;

Figures 9 and 10 are enlarged fragmentary side and left end elevations, respectively, of the gathering device illustrated in Figure 6a;

Figure 11 is a section taken on 11—11 of Figure 9;

Figure 12 is a section of 12—12 of Figure 9;

Figure 13 is a fragmentary view of one of the drive rolls of the gathering device disposed in a plane with the flattened wire;

Figures 14, 14a and 14b are diagrammatic side elevations showing three stages of the action of the wire during the gathering or buckling operation;

Figure 15 is a right end view of the sizing device and

Figure 16 is a top plan view of the sizing device illustrated in Figure 6a and partially sectioned for clarity;

Figure 17b is a vertical sectional view taken on the line 17b—17b of Figure 17a; and Figure 18 is an enlarged side elevation showing a modified form of coining feed rolls.

Figure 6A:
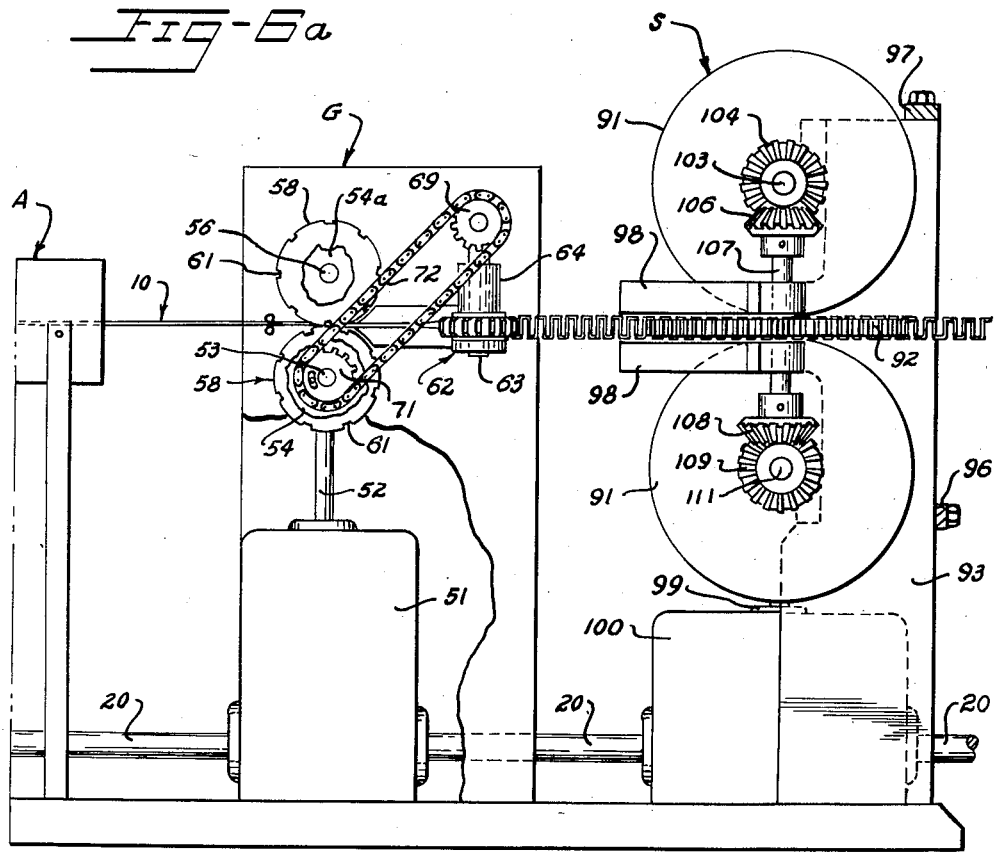
Figure 6a is a side elevation showing the annealing, gathering and sizing apparatus with unnecessary details being omitted for clarity and is a continuation in the direction of feed of the structure illustrated in Figure 6.

The general nature of the operations performed on the wire will first be described with references to Figures 1 to 4. The first operation on the wire itself is shown in Figure 1, this being an alternate coining or punching operation, an important purpose of which is to weaken the wire so as to facilitate subsequent bending. In the form shown here, a pair of punches 11 and 11a are spaced apart somewhat more than twice the distance represented by the length of each individual pin of the completed element. Each punch has a concave nose 12 and 12a respectively, the purpose of the concavity being to reduce longitudinal flow of the metal.

The punches strike alternately and in between the blows the wire is fed slightly less than half the centerline distance between the punches by means that will be described presently. As each punch strikes the wire the material of the wire flows laterally and although the concave nose of the punch reduces the action somewhat, the wire also elongates so that after the punching operation is completed by punch 11 for example, there will be formed beveled shoulders 13 on the pin 14 and a flattened ligament 16. Corresponding parts are formed by the other punch 11a. By way of example, and throughout this specification, the apparatus and methods will be described as applied to annealed iron wire having a diameter of $\frac{1}{16}$ of an inch flattened to 25% of its diameter. In other words, the average thickness of the ligaments of 16 and 16a will be 15 to 17 thousandths of an inch. The pin length, that is the length of elements 14 and 14a is $\frac{1}{2}''$ in this example.

The wire is next alternately gathered, buckled, or folded to produce the sinuous form shown in Figure 2. Depending upon the construction and adjustment of the apparatus, the pins 14 and 14a may or may not be parallel after the gathering operation. If they are not parallel they are brought into alignment, as shown in Figure 3, before or during the sizing operation. During the sizing operation the ligaments 16 and 16a are externally flattened, as also are the tapered shoulders 13 and 13a shown in Figure 1. At this point it will be noted that the presence of the angular or beveled ends or shoulders 13 and 13a of pins 14 and 14a complicates the sizing operation in that not only must the buckling or bending of the ligaments 16 and 16a be removed and the ligaments disposed with their outer faces flat but also the shoulders 13 and 13a, which provide the ends of the finished legs 14 and 14a, must be slightly coined or flattened so as to make them substantially coplanar with the outer surfaces of their associated ligaments. When this operation is completed, the end surfaces of two adjacent legs and the outer surface of the ligament joining them form a smooth, continuous surface which preferably is flat. When the ends of the legs are so formed, they may be directly bonded to a plate, tube or other wall member, giving the shortest possible heat path in the metal.

In Figure 4, the completed sinuous element is shown brazed between a pair of fluid confining plates 17, as described in my aforesaid application, it also being understood that the sinuous elements may be bonded to a single metal surface, which due to the flexible nature of the elements, need not be flat but may be a tube or may have other non-planer configurations.

*Preferred lineup of apparatus*

The preferred lineup of apparatus appears in a simplified form in Figures 6 and 6a. The apparatus includes a roll feeding unit F which runs continuously; a punching or coining press C, which for example for the size of wire mentioned may operate at 1800 R. P. M.; an annealing oven A, which may heat the wire by radiation, conduction, electrical resistance heating, or high frequency induction and which provides an intermediate anneal between the original punching operation by the punches 11 on one hand and the flattening and the gathering operations on the other hand; a gathering machine G, which performs the folding or buckling operation, and a sizing machine S which flattens, coins, or squares off the ligaments and the ends of the pins. It is necessary that all of these units be synchronized one way or another although the design details of the means whereby synchronization is attained is not critical to the invention. Thus, by way of illustration, all the units may be tied together by a single line shaft 20 which may be driven by a gear or a sprocket 21. Suitable gear boxes, which may be combined with adjustable speed reducers are driven by the line shaft 20 and connect to the various units as required.

*The feeding operation*

Wire feeding is effected by a pair of continuously rotated and grooved feed rolls 22 mounted in suitable frame structure 23 and driven in the arrangement shown by a vertical shaft 24, carrying suitable bevel gears to connect to the line shaft 20. As usual the feed rolls 22 are mounted on shafts journaled in the frame and are geared together by gears 26 seen best in Figure 7. A feature of this form of feeding and punching is the tube 27, mounted in the feeding device and also fixed to the coining press C by means of flange 28, which tube plays an important part in the feeding operation. It is clear that the wire will be temporarily restrained during the coining operation by the action of the punches and a continuous feed which under these circumstances has always presented a problem. Intermittent or hitch feeding may be suitable for relatively slow feed operations but it is not precise and dependable at the speeds contemplated by this invention. It has been proposed to eliminate the need for a flying punch by allowing the stock to buckle during the punching operation, but this is not proven to be a precise and uniform means of feed. Under this invention, precision and uniformity of feed are attained by utilizing the natural resilience of the wire stock itself. Precision is attained by confining the stock in the tube 27 so that the wire just freely slides therethrough. The length of the tube 27 can be determined by the conditions of the operations and depends primarily upon three factors; namely the speed of the punching operation (which determines the period of time during which the wire must be confined at the punch); secondly, the modulus of elasticity and yield point of the material being operated upon; and thirdly, the required length feed—this is, the length of pins 14 and 14a in this case. For example, with annealed low carbon iron wire stock $\frac{1}{16}$ inch in diameter pins $\frac{1}{2}$ inch long and 1800 punches per minute by each punch, I have found that the tube 27 should have a minimum length of three and one half feet and prefer to use, as a factor of safety to insure that the wire will not be compressed beyond its yield point, a tube 16 feet long. Thus, during the fraction of a second that the wire is restrained by the high speed punch it is merely compressed within the tube and as soon as it is released it restores itself to its unstressed length which compression represents in this example, the circumferential motion of the feed rolls during punching. So long as wire is not compressed beyond its yield point and is of fairly uniform metallurgical analysis the feed will be precise, but it is to be noted here that the practicality of this operation depends upon the punch engaging the wire only a small fraction of the time interval between successive hits of the punches. Otherwise, the dwell of the punch within the stock will be so long as to render this type of continuous feed cumbersome in that tube 27 would be so long as to be unwieldy.

*The coining device*

The coining device is shown in simple form in Figures 6 and 8. Two important factors have been considered in the method and apparatus employed for the punching operation. These are first, such method must be capable of high speed operation, and second, in view of the nature of the subsequent sizing operations in the final product. any angularity of the bevels of the pin-ends such as shown in 13 and 13a in Figure 1 should be held to a minimum and are preferably equally distributed between the two sides of the notches. This also precludes a multiple array or row of punches advancing and retracting together, because in such case the metal between individual punches is confined whereas that at each end of the array is unconfined and can flow away from the end punches to produce a non-uniform notch as compared to the notches produced where the metal is confined at each side by a punch. The fact that in the preferred form of the invention, the wire is punched from alternate sides also presents a problem which precludes the use of many standard single acting high speed machines. Thus, I prefer to use a pair of rotary cams which force single resiliently retracted plungers alternately into opposite sides of the wire, the punches being spaced as mentioned by twice the length of the pins 14 and 14a plus the length of the ligament between the pins. For example with ½ inch long pins and ⅛″ ligaments, the punches will be approximately 1¼″ apart and the total feed will be approximately ⅝ of an inch, the latter two distances being best found by test if extreme precision of leg length and spacing are desired, because the flow of metal during the punching has a slight effect on these dimensions which is difficult to calculate in advance.

The coining machine C comprises a frame 30 in which are mounted a pair of shafts 31 carrying rotating discs 32. These discs are of such a size and inertia that the force required by the coining operation might be largely absorbed by the discs without any appreciable deflection of the shafts. The discs are geared together by sprockets 33 and connected by chain 34 and the lower shaft 31 is driven from a gear box 36, which contains suitable gearing to operate or rotate the discs at the desired speed of 1800 R. P. M. in this example from the line shaft 20. Each disc 32 has machined therein a cylindrical groove containing a bearing 37 of suitable material such as hardened steel or the like and a cylindrical cam roller 38, such rollers being retained by snap rings 39, for example as seen in Figure 8, lower part of the figure.

The punches 11 and 11a reciprocate in suitable bores formed in die blocks 41 and 41a, respectively. The punch bores merge with larger bores which receive rubber blocks 42 and 42a vulcanized to the respective punches and acting as springs to retract the punches from the work. Plungers 43 slide in enlarged ends of the bores and are engaged by the cams or rollers 38 to deform the work. The rollers 38 are arranged so that they are 180° out of phase and strike the work from the opposite sides in alternate sequence. A press of this construction is capable of high speed operation, because it is a continuous rotary device and depends upon the inertia of its parts to withstand the force of the blow. Since this is inherently a high speed device it reduces the dwell of the punches in the work and hence the amount that the wire must be compressed in the tube 27. This in turn holds the required length of tube 27 down to a practical and convenient figure.

In some cases I contemplate employing the conventional roll forming process to punch, flatten, or weaken the wire and form ligaments 16 and 16a.

The gathering or folding machine

After leaving the annealing oven A, the coined or punched wire passes through the gathering machine G shown in Fig. 6a as well as Figures 9 to 13. This machine comprises essentially a pair of notched feed rolls for positively feeding the notched wire and a hold back gear or rotating toothed wheel 62 having a circumferential speed slower than that of the feed rolls. The relative speeds of the rolls and the hold back gear are adjusted so that the wire alternately buckles or folds or gathers laterally into the approximate position shown in Figure 2 or 3 depending upon the design and adjustment of the machine. The drive for the gathering machine is not critical to the invention and may include a gear box 51 which may also have built therein a speed variation device, a driving vertical shaft 52, which by means of beveled gears not shown or any equivalent arrangement turns a horizontal shaft 53 in the gathering machine. A pair of gears 54 and 54a is included to synchronize the feed rolls, one of which is mounted on shaft 53 and the other which is mounted on shaft 56. These gears are shown broken away entirely in Figure 6a for clarity and the upper gear and its support are removed in Figure 10, in order to show parts therebehind. However, both gears appear in Figure 9 although they are partially broken away to disclose the feed rolls. The overhanging ends of the shafts 53 and 56 are mounted in brackets 57, respectively, which are secured to the frame of the machine by suitable bolts, as illustrated in Figures 9 and 10. Shafts 53 and 56 mount the feed rolls 58 which rolls are grooved at 59 to receive the wire and notched at 61 to receive the flattened ligaments on the wire. The notches are staggered on the rolls to match the staggering of the notches on the wire. The hold back gear or toothed wheel 62 is mounted on a shaft 63 carried in a bracket 64 which is fastened on the frame of the machine by means of countersunk screws as illustrated in Figure 9. At its other end the shaft 63 carries a bevel gear 66 driven by a smaller bevelled gear 67 on a horizontal shaft 68. This bevel gear drive appears in Figure 10 in which figure it can also be seen that a drive sprocket 69 is mounted on shaft 68. A second sprocket 71 is loosely mounted on the other shaft 53, and means are provided to adjust the relation of the notches in the feed roll to the teeth in the gathering gear 62, the sprockets being connected by a chain 72. In order to provide for the aforesaid adjustment, sprocket 71 is loosely mounted on the shaft and a collar 73 is keyed to shaft 53 by a set screw or its equivalent. The collar has the usual opposed set screws 74 that engage a pin 76 which is pressed into the sprocket 71 and rides in a circular slot 77 formed in the collar 73. Thus, it can be seen that by releasing one set screw and taking up on the other, the angular relation between the drive rolls and the back up gear 62 can be adjusted.

In order to guide and confine the wire during the gathering operation a pair of plates 78 are clamped between cover plates 79 and 81 by means of screws, as illustrated in Figure 11, to provide a groove 82 wide enough to receive the flattened wire. Preferably, these plates diverge toward the gathering or back up gear 62, as indicated at 83, Figure 9, to help confine the wire during the folding or buckling operation.

The nature of the gathering operation can be best understood from Figure 5 and Figure 14, 14a and 14b. Referring to the latter figures, three stages in the operation are illustrated. The hold up gear is not shown in these views, it being understood that as seen in Figure 5 the pins 14 and 14a are forced against the teeth of the gear by the drive rolls which move faster than the gear thereby permitting the rolls to exert a buckling force on the wire. The drive rolls feed the wire relative to the hold back gear 62 so that the wire moves relative to the gear 62 in a tangential path intersecting the teeth of the gear 62. The distance X indicated in Figure 5 merely represents a tolerance in a sense that in the scale shown in this particular drawing distance X represents the maximum angularity of the legs as they enter the gear teeth themselves. In other words, the folding or buckling operation must have proceeded to at least the point illustrated in Figure 5 at X if interference with the gear teeth is to be avoided. As a matter of fact, the operation can be adjusted by means of the adjustment means on the drive sprocket so that it is possible to bring the legs into parallelism as they enter the back up gear. Referring to Figure 14, the legs have been numbered by the letters *a* to *f* for clarity and ease of explanation. It will be seen that legs *f* and *e* are confined by the plates 78 and thereby cannot bend or buckle. Leg *d* has just cleared the confining groove and is entering the divergent portion 83 of the guides, it has buckled to the right because leg *c* has buckled to the left, which action in turn was caused by leg *b* buckling to the right and so on. Thus, it can be seen that once the initial direction of the buckling of the first free leg leaving the confining grooves when the machine is started is determined, the buckling process must then necessarily take place as an automatically self-alternating buckling process. Thus, in Figure 14a the wire has advanced somewhat and the leg *e* is emerging from confinement but is still maintained in an unbent position by the guides but the angularity of legs *c* and *d* is increasing. This action continues until the position shown in Figure 14b wherein leg *e* is now clear of confinement and therefore, must necessarily be carried or be buckled to the left in that figure because of the relationship of leg *d*. Thus, an automatic folding or buckling operation is obtained by forcing the legs against the back up gear teeth of gear 62, and once the operation is started, it will continue to give the desired alternate relationship of the legs relative to the flattened ligaments. The portion of the confining plates diverging as at 83 are not necessary to the buckling operation itself but do assist in centering the ligaments laterally so that they will clear the sides of the gear teeth on gear 62. It will also be seen that this is an inherently high speed operation so that the gathering operation by no means limits or determines the maximum speed of travel of the wire relative to the other operation. I have found that for this operation to be successfully carried out, at least two legs 14 and 14a should be free to begin buckling between their point of confinement by plates 78 and the gear wheel abutments.

*The sizing or flattening operation*

Figure 17:
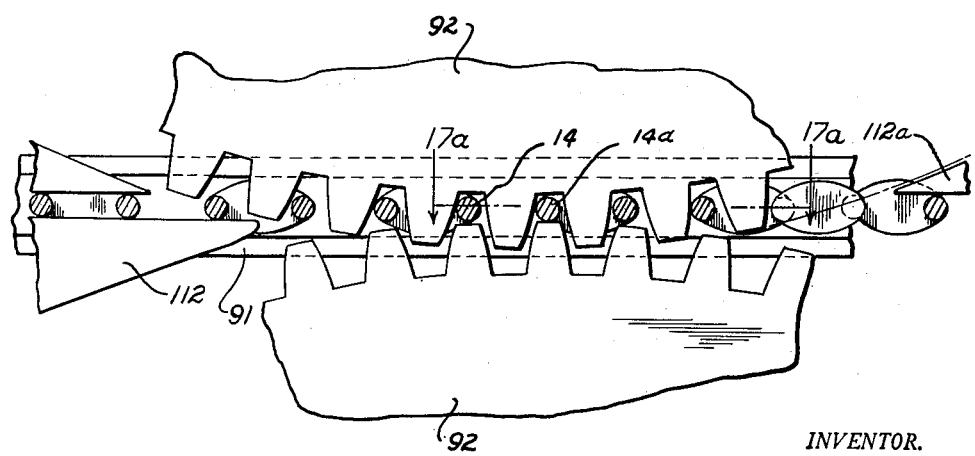
Figure 17 is an enlarged side elevation of the feed gears at the coining section.
Figure 17A:
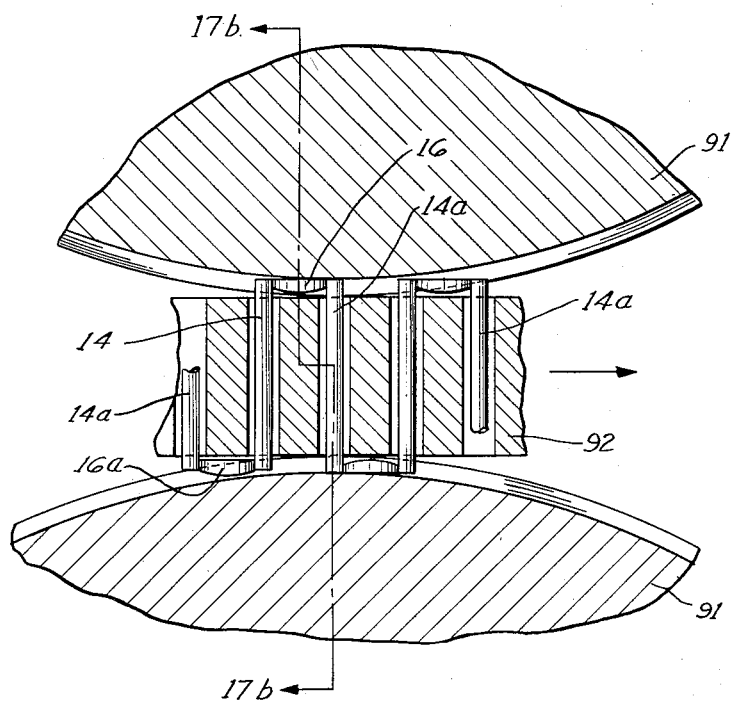
Figure 17a is a horizontal sectional view taken on the line 17a—17a of Figure 17.
Figure 17B:
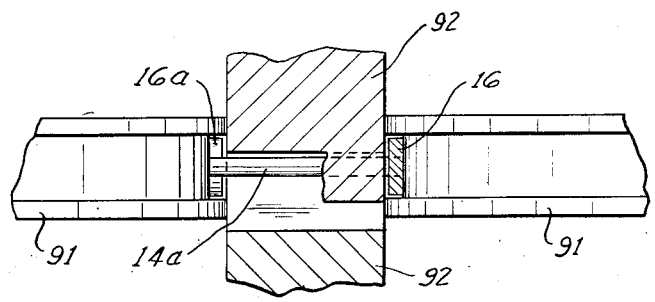

After leaving the gathering machine G, the sinuous wire is operated on in order to flatten the ligaments 16 and 16a and square up the pins so that they may be bonded to plates or tubes as shown in Figure 4. This is the function of the sizing machine S which is essentially a device for rolling the ligaments into a flattened condition. The sizing machine, Figures 15 and 16, comprises a pair of rolls 91 grooved to receive and guide the ligaments and a pair of large mesh gears 92, the rolls and gears being all synchronized or driven together and as seen in Figure 17, gears 92 have their axes spaced sufficiently so that there is sufficient clearance between the addendum and dedendum of their teeth to receive the legs 14 of the sinuous element. The assembly is mounted on a supporting plate 93 and another plate 94 is spaced therefrom, the plate 94 being removed for clarity in Figure 6a. These two plates are welded to another pair of spaced plates 98 as best seen in Figure 16. The four plates form a frame-work for a beveled gear train making it possible to drive both the gears and rollers simultaneously. Suitable tie bars such as shown in 96 and 97 may be added, it being understood that the design details of the frame form no part of the invention, but the frame is strong enough so that the outermost peripheral surfaces of the rolls 91, along opposite sides of the grooves of each, roll against the opposite side faces of the gears 92 at the location in which the gears 92 are most nearly fully in mesh, this rolling contact being under preloading with a preloading force exceeding the expected forces required to perform the coining or flattening operation. While the outermost peripheral surfaces of the rolls 91 at the opposite sides of the grooves therein bear against the side faces of the gears 92, or their gear teeth, as shown in dotted lines in Fig. 17, the peripheral wall at the base of the groove of each roll 91 successively engages and displaces the ligaments at its face of the gears 92 bodily inwardly toward the adjacent side face of the respective gear tooth as shown in Fig. 17a, thus levelling them off and flattening them. As a pin or leg 14 or 14a passes between the point of nearest approach of the two rolls 91, it is confined between the teeth of the gears 92 as illustrated in Figure 17 so that it cannot buckle or collapse. While thus confined, the pressure from the base of the grooves in the rolls 91 is applied axially of the pins, thus first shifting the pins axially for proper alignment. The distance between the bases of the grooves is such that at their point of nearest approach, they are separated a distance equal to the length of the finished pin such as illustrated in Figure 3 after the shoulders 13 and 13a have been flattened. This same action, of course, bodily displaces the ligaments 16 and 16a inwardly toward the faces of the gears 92 so that their outer surfaces are brought flush or coplanar with the outer ends of the pins as illustrated in Figure 3. Accordingly, the ligaments 16 and 16a and ends of the legs 14 and 14a are flattened by applying opposed forces at opposite sides of the sinuous wire elements while the adjacent legs are constrained from collapsing by the teeth of the gears 92. Thus, as illustrated in Figure 15, the throat, in which is located the wire indicated at 10 and in which this action takes place, is of a length measured from the base of the groove of one roll 91 to the base of the groove of the other equal to the length of a pin such as illustrated in Figure 3 after the ends have been flattened. The depth of the grooves in the rolls 91 may be substantially equal to or greater than the thickness of the ligaments 16 and 16a as the ligaments 16 and 16a preferably are moved bodily inwardly and are usually sufficiently thin from their original formation by the punches 11 so as not to require additional thinning during the gathering and flattening operation. The rolls and gears are driven by a vertical shaft 99 extending from a suitable gear box 100 connected to the line shaft 20. Mounted on shaft 99 is a beveled gear 101 meshing with a second beveled gear 102 keyed to a cross shaft 103 and which in turn, drives the uppermost roll 91. The driving assembly includes a beveled gear 104 on shaft 103 meshing with a beveled gear 106 on a right angle shaft 107 which serves to drive one of the gears 92, the other gear 92 being keyed to the shaft 99. The drive is completed by a beveled gear 108 meshing with a second gear 109 on a right angle shaft 111 which is parallel to shaft 103 and is keyed to the other or lower roll 91. Thus, the rolls and gears are rotated by a single shaft 99 which in turn is rotated by the line shaft. As seen in Figures 16 and 17, guide means 112 are provided to hold the sinuous wire in position as it enters the gears and rolls. Also suitable stripping means such as fingers 112a conform closely to the upper gear 92 as it is seen in Figure 17 to insure that the wire does not follow the gear around.

The gears 92 serve not only to propel the wire between the rolls for the flattening operation but may also serve to completely bring the pins 14 and 14a into parallelism, providing this action was not completely carried out in the gear of the gathering machine as shown in Figure 5. If the gears 92 serve to additionally gather the element by bringing the legs closer into parallelism, such gears will have a linear speed at the wire element that is somewhat less than the linear speed of the wire element as it leaves the gathering gear 62. As a matter of fact, as an alternate construction, I contemplate that the gears 92 might serve as back up means for the gathering operation thereby assuming the function of gear 62 to the gathering machine. The flanges or ligaments 16 and 16a, the lower parts of the pins 14 and 14a have been omitted for clarity in Figure 17 where it can be seen that the shape of teeth of gears 92 may be of the conventional involute construction. Thus, a final gathering action can take place at these gears whereby the pins are gradually brought into parallelism as they pass the plane of the gear axes.

The extension of shaft 20, seen to the lower right of Figure 6a may drive a second coining machine like machine S, in order to divide up the coining step and insure a planar ligament structure. Also, as suggested in Figure 18, gears 92 of apparatus S may be replaced by notched wheels 92a having air foil pockets 113 formed in their peripheries to convert cylindrical legs 14 and 14a into air foil legs 14b and 14c to decrease drag and turbulence in use. The air foil axis can obviously be turned 90° from that shown.

After the wire emerges from the sizing machine, it is cut into the desired lengths depending upon the nature of the heat exchanger or structural assembly under fabrication. These lengths are either coated with copper paste or cemented or otherwise bonded to strips or sheets of copper foil which assemblies are placed between plates 17 or other fluid separating walls or tubes and pass through a brazing furnace which simultaneously joins all the parts. Of course, as referred to in my aforesaid application, several layers may be simultaneously bonded together which layers when connected by suitable headers, form a very efficient heat exchanger.

The pins 14 and 14a act as pressure stays in case the device must be subjected to high pressure, or they act as columns in case the assembly is a structural element wherein the plates are under load.

Having completed a detailed description of the preferred embodiment of the invention, it will be understood that I am not limited to such embodiment, but rather to the invention as defined in the appended claims.

I claim:

1. The method of forming elongated sinuous wire elements having generally parallel legs connected alternately by integral, spaced, relatively flattened ligaments, comprising the steps of positively feeding wire having aligned legs and ligaments in a tangential path intersecting the teeth of a rotating toothed wheel so that each leg is gathered into the recess between two teeth of the wheel and the wire is folded at the ligaments, by maintaining the ratio of the linear rate of feed of the unfolded wire to the peripheral rate of motion of the toothed wheel substantially equal to the ratio of the sum of the linear lengths of one leg and one flattened ligament to the length between the axes of adjacent legs after the wire is folded.

2. The method of forming elongated sinuous wire elements having generally parallel legs connected alternately by integral, spaced, relatively flattened ligaments, comprising the steps of positively feeding wire having aligned legs and ligaments in a tangential path intersecting the teeth of a rotating toothed wheel so that each leg is gathered into the recess between two teeth of the wheel and the wire is folded at the ligaments, by maintaining the ratio of the linear rate of feed of the unfolded wire to the peripheral rate of motion of the toothed wheel substantially equal to the ratio of the sum of the linear lengths of one leg and one flattened ligament to the length between the axes of adjacent legs after the wire is folded and simultaneously flattening said ligaments by applying opposed forces at opposite sides of the sinuous wire elements while restraining the adjacent legs from collapsing.

3. The method of forming elongated sinuous wire elements having generally parallel legs connected alternately by integral, spaced, relatively flattened ligaments, comprising the steps of positively feeding wire having aligned legs and ligaments in a tangential path intersecting the teeth of a rotating toothed wheel so that each leg is gathered into the recess between two teeth of the wheel and the wire is folded at the ligaments, by maintaining the ratio of the linear rate of feed of the unfolded wire to the peripheral rate of motion of the toothed wheel substantially equal to the ratio of the sum of linear lengths of one leg and one flattened ligament to the length between the axes of adjacent legs after the wire is folded and simultaneously flattening said ligaments by applying opposed forces at opposite sides of the sinuous wire elements while restraining the adjacent legs from collapsing and coining said legs into airfoil shape.

4. The method of forming elongated sinuous wire elements having generally parallel legs connected alternately by integral, spaced, relatively flattened ligaments, comprising the steps of positively feeding wire having aligned legs and ligaments in a tangential path intersecting the teeth of a rotating toothed wheel so that each leg is gathered into the recess between two teeth of the wheel and the wire is folded at the ligaments, by maintaining the ratio of the linear rate of feed of the unfolded wire to the peripheral rate of motion of the toothed wheel substantially equal to the ratio of the sum of the linear lengths of one leg and one flattened ligament to the length between the axes of adjacent legs after the wire is folded and simultaneously flattening said ligaments by applying opposed forces at opposite sides of the sinuous wire elements while restraining the adjacent legs from collapsing and coining said legs into airfoil shape while further flattening said ligaments.

5. The method of forming elongated sinuous wire elements comprising the steps of reducing the thickness of the wire at equally spaced intervals to form legs and flats, forcing said deformed wire against rotating abutments at a linear speed greater than that of said abutments and confining said wire against buckling up to a point spaced from said abutments by a distance exceeding the length of two legs, thereby causing said wire to fold alternately at said flats between said point of confinement and the points of engagement of said wire and abutments.

6. The method of forming elongated sinuous wire elements comprising the steps of reducing the thickness of the wire at equally spaced intervals and from opposite sides to form legs and staggered flats, forcing said deformed wire against rotating abutments at a linear speed greater than that of said abutments and confining said wire against buckling up to a point spaced from said abutments by a distance exceeding the length of two legs, thereby causing said wire to fold alternately at said flats between said point of confinement and the points of engagement of said wire and abutments.

7. The method of forming elongated sinuous wire elements comprising the steps of reducing the thickness of the wire at equally spaced intervals to form legs and flats, forcing said deformed wire against rotating abutments at a linear speed greater than that of said abutments and confining said wire against buckling up to a point spaced from said abutments by a distance exceeding the length of two legs, and gradually relieving said confinement between said point and said abutments thereby causing said wire to fold alternately at said flats between said joint of confinement and the points of engagement of said wire and abutments.

8. The method of forming elongated sinuous wire elements comprising the steps of reducing the thickness of the wire at equally spaced intervals to form legs and ligaments, forcing said deformed wire against rotating abutments at a linear speed greater than that of said abutments and confining said wire against buckling up to a point spaced from said abutments by a distance exceeding the length of two legs, and gradually relieving said confinement between said point and said abutments thereby causing said wire to fold alternately at said ligaments between said point of confinement and the points of engagement of said wire and abutments and applying opposed forming forces to the outer surfaces of opposed ligaments to render the outer surfaces of the ligaments on each side of the element substantially co-planar.

9. The method of forming sinuous wire elements comprising the steps of reducing the thickness of the wire at equally spaced intervals to form legs and ligaments, forcing said deformed wire against rotating abutments at a linear speed greater than that of said abutments and confining said wire against buckling up to a point spaced from said abutments by a distance exceeding the length of two legs, thereby causing said wire to fold alternately at said ligaments between said point of confinement and the points of engagement of said wire and abutments, and rolling the ligaments to render the outer surface of those on each side of the element substantially co-planar for improved bonding characteristics.

10. The method of forming wire into elongated sinuous elements comprising the steps of weakening straight wire to facilitate bending at regularly spaced intervals along its length, and gathering the wire into sinuous form by feeding the straight wire positively against abutments moving in the direction of feed of the straight wire while maintaining the linear rate of motion of the abutments less than the rate of feed of the straight wire.

11. The method of forming wire into elongated sinuous elements comprising the steps of weakening straight wire to facilitate bending at regularly spaced intervals along its length, and gathering the wire into sinuous form by feeding the straight wire positively against abutments moving in the direction of feed of the straight wire while maintaining the linear rate of motion of the abutments less than the rate of feed of the straight wire and flattening the weakened portions to render those on each side of the sinuous element substantially co-planar.

12. The method of forming elongated sinuous wire elements comprising the steps of confining the wire against buckling in all directions, continuously and positively feeding the wire while so confined while intermittently reducing the thickness of the wire at regularly spaced intervals to form legs and flats, forcing said deformed wire against rotating abutments at a linear speed greater than that of said abutments and confining said wire against buckling up to a point spaced from said abutments by a distance exceeding the length of two legs, thereby causing said wire to fold alternately at said flats between said point of confinement and the points of engagement of said wire and abutments.

13. The method of forming elongated sinuous wire elements comprising the steps of reducing the thickness of a length of wire at spaced intervals along its length to form alternate legs and ligaments, which ligaments are elongated endwise of the wire and are relatively thin, moving the wire continuously endwise along one portion of a lineal path at predetermined speed, and, beginning at another portion of said path beyond the one portion in the direction of wire travel, progressively reducing the speed endwise of said path, of the leading end of each leg, successively, during passage of each leg along said latter portion, so as to cause each leg, in turn, to swing about its leading end and bend the metal at the juncture of the swinging leg with its associated ligaments and thereby dispose each leg in a direction generally transversely of said path during travel of each leg along said latter portion of said path, whereby said legs are folded alternately and in opposite directions across said path and are spaced apart from each other endwise of the path by the ligaments, then, upon their being positioned transversely, temporarily confining the legs and advancing them at a predetermined speed while flattening the outer faces of the ligaments and legs by simultaneously applying at each side of the element controlled forces directed toward the opposite side.

14. The method according to claim 13 characterized in that adjacent flats are formed so that they are spaced in different directions from the axis of the wire.

15. Apparatus for forming sinuous wire elements having flattened ligaments connected by generally parallel legs comprising means to flatten the wire alternately and oppositely along its length during travel of the wire along a predetermined path, a pair of grooved and notched feed rolls arranged along said path beyond said flattening means in the direction of wire travel, the grooves receiving the wire between the flattened parts and the notches of the rolls receiving alternately the flattened parts, a rotatable gear-like member arranged along said path and spaced from said feed rolls in the direction of wire travel and having its axis of rotation perpendicular to that of said feed rolls, wire confining guides between said rolls and member and diverging in the direction of wire motion, said guides having an axial dimension exceeding the length of two legs of the wire, and means to drive said rolls at one speed and said member at a slower speed.

16. Apparatus for forming sinuous wire elements having flattened ligaments connected by generally parallel legs comprising means to flatten the wire alternately and oppositely along its length, a pair of grooved and notched feed rolls, the grooves receiving the wire between the flattened parts and the notches of the rolls receiving alternately the flattened parts, a rotatable gear-like member spaced axially from said feed rolls with its axis of rotation perpendicular to that of said feed rolls, wire confining guides between said rolls and member and diverging in the direction of wire motion, said guides having an axial dimension exceeding the length of two legs of the wire, means to drive said rolls at one speed and said member at a slower speed, a pair of meshed gears with axes parallel to that of said member and spaced so as to receive the wire legs between the addendum of one gear and the dedendum of the other, a pair of opposed wire ligament flattening rolls with axes parallel to those of said feed rolls, and means to drive said gears and flattening rolls at a slightly slower linear speed than that of the sinuous wire leaving said member.

17. Apparatus for forming wire elements having flattened ligaments connected by generally parallel legs comprising means to feed a length of wire endwise continuously along a given path, diametrically opposed and axially spaced wire flattening projections arranged along said path for oppositely and alternately flattening the wire to form axially spaced ligaments during travel along said path, a pair of opposed notched feed rolls for positively feeding the flattened wire, said rolls being arranged along said path beyond said projections in the direction of wire travel, wire restraining means including moving abutments arranged in said path beyond the restraining means in the direction of wire travel, means for driving the abutments at a linear speed slower than the linear speed of said notched feed rolls, a wire confining guide between said notched feed rolls and said abutments, said guide diverging toward said abutments, whereby said wire is confined and gathered into the above mentioned sinuous form, meshed gears disposed in said path beyond the abutments in the direction of wire travel and arranged so that their teeth travel generally lengthwise of and along a portion of said path for receiving between the dedendum of one gear and the addendum of the other gear the legs of the wire that connect to the ligaments to bring and hold the legs in substantial parallelism while the legs extend transversely of the path and generally endwise of the gears, opposed rolls at opposite faces of the gears, respectively, and having peripheral surfaces in rolling engagement with the legs while the legs are confined and with the ligaments adjacent the confined legs, and opposed notched wheels in said path beyond the rolls and having grooves for receiving the legs, said grooves of the notched wheels, when the grooves are aligned, forming air-foil shaped leg coining pockets, and means to drive the said rolls, abutments, gears, opposed rolls and wheels in timed relation to each other.

(References on following page)

References Cited in the file of this patent

UNITED STATES PATENTS

| | | | |
|---|---|---|---|
| 14,585 | Harrington | Apr. 1, | 1856 |
| 249,281 | Williams | Nov. 8, | 1881 |
| 383,328 | Sweet | May 22, | 1888 |
| 1,187,138 | Garllus | June 13, | 1916 |
| 1,205,005 | Mayo | Nov. 14, | 1916 |
| 1,246,145 | Nelson | Nov. 13, | 1917 |
| 1,646,974 | Moyer | Oct. 25, | 1927 |
| 1,678,941 | Helman | July 31, | 1928 |
| 2,071,584 | Shippy | Feb. 23, | 1937 |
| 2,071,603 | Winterhalter | Feb. 23, | 1937 |
| 2,257,993 | Young | Oct. 7, | 1941 |
| 2,552,109 | Nahman | May 8, | 1951 |
| 2,595,457 | Holm | May 6, | 1952 |

FOREIGN PATENTS

| | | | |
|---|---|---|---|
| 317,753 | Germany | Dec. 29, | 1919 |
| 330,087 | Great Britain | June 5, | 1930 |